Figure 11:
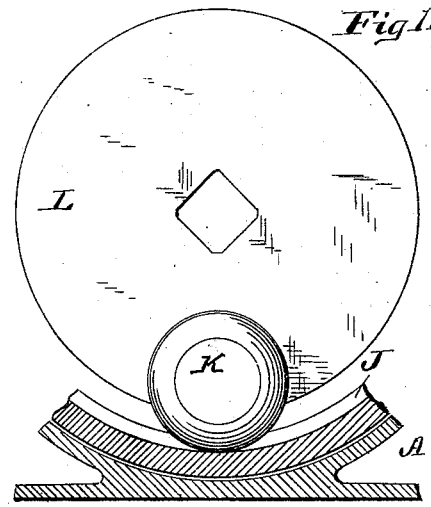

(No Model.)　　　　　　　　　　　　　　　　　　　2 Sheets—Sheet 1.
H. B. FELDMANN.
PULVERIZING MACHINE.
No. 347,480.　　　　　　　　　　Patented Aug. 17, 1886.
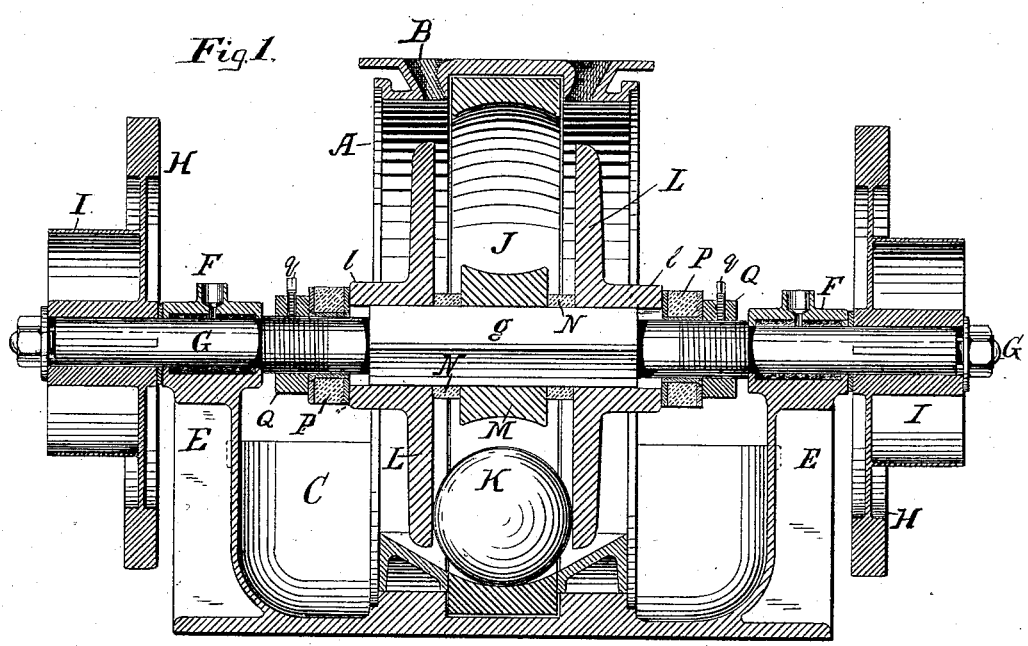
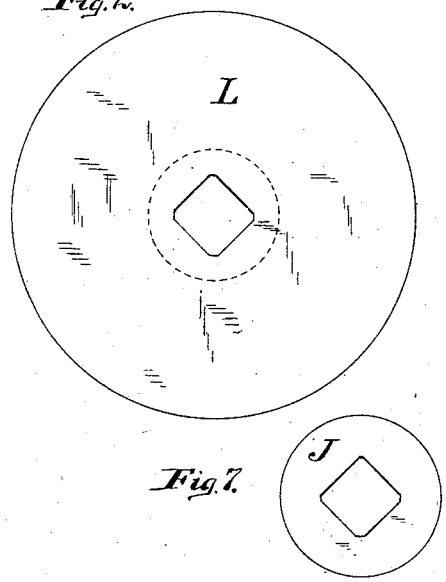
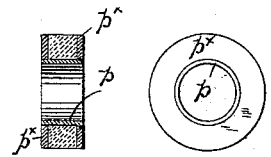
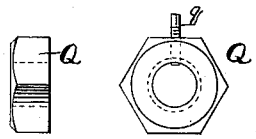
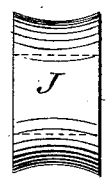
WITNESSES:
John Jolley
F. N. Dixon.
H. B. Feldmann
INVENTOR
By his Attorneys
Wm. E. Strawbridge
Bonsall Taylor
N. PETERS, Photo-Lithographer, Washington, D. C.

(No Model.) 2 Sheets—Sheet 2.

H. B. FELDMANN.
PULVERIZING MACHINE.

No. 347,480. Patented Aug. 17, 1886.

WITNESSES:
John Jolley
F. N. Dixon

H. B. Feldmann
INVENTOR
By his Attorneys
Wm. C. Strawbridge
Bonsall Taylor

UNITED STATES PATENT OFFICE.

HERMANN BERNHARD FELDMANN, OF PHILADELPHIA, PA., ASSIGNOR OF ONE-HALF TO STEPHEN P. M. TASKER, OF SAME PLACE.

PULVERIZING-MACHINE.

SPECIFICATION forming part of Letters Patent No. 347,480, dated August 17, 1886.

Application filed April 23, 1886. Serial No. 199,915. (No model.)

*To all whom it may concern:*

Be it known that I, HERMANN BERNHARD FELDMANN, a citizen of the United States, residing in the city and county of Philadelphia, and State of Pennsylvania, have invented certain Improvements in Pulverizing-Machines, of which the following is a specification.

My invention, broadly considered, relates to and embodies improvements upon a certain novel pulverizing-machine invented by William Henry Thompson, of Islington, county of Middlesex, Kingdom of Great Britain, and patented to him in and by Letters Patent of the United States No. 249,489, dated November 15, 1881, to which Letters Patent reference is first to be made for a more clear comprehension of my present improvement.

Broadly stated, Thompson's invention consists in the combination, within a suitable inclosing-case embodying in its own structure a vertically-erected hollow circular track, of an independent sphere or ball adapted to revolve around the casing, and of given means for imparting to the ball not only revolution around the casing-track, but also rotation about its own axis. Certain other features of construction enter into the Thompson invention which are dispensed with by me, as the organization of my machine avoids their employment.

In the Thompson machine, as also in mine, material to be pulverized is fed through a hopper into the casing, and is crushed by the combined revolution and rotation of the sphere or ball. The means employed by Thompson for effecting the combined movement of the ball are a pair of vertically-erected disks provided with peripheral beveled bearing-surfaces, and arranged face to face at some distance on either side of the center of a shaft horizontally journaled through the casing, and by which they are revolved. The disks are capable of rocking movements by virtue of being each loosely hung or supported on the shaft between two collars having curved bearing-faces. The collars prevent a lateral movement of the disks at their center.

The operation of the disks and ball is described by Thompson in the following language, which also I regard as of importance to restate here, in order that a more thorough comprehension of my improvements may be had. Thompson says: "The operation of the disks and ball is substantially as follows: When the disks are revolved their tendency is to assume a position exactly at right angles to the shaft; but as they cannot do this, for the reason that the diameter of the ball at the point of contact exceeds the distance between the adjacent bearing-faces, it follows that they bear or press upon the ball in their effort to assume this position and crowd the latter against the casing with greater or less force, according to the rapidity of the revolution. The disks also, by the friction of the contact, carry the ball with them in their revolution about the casing, and thus communicate to it a centrifugal action. The disks also, by the friction of this contact, communicate to the ball also an axial rotation. The ball then, it will be understood, is caused to act upon the material to be pulverized with a resultant force, which is obtained from three distinct sources, as follows: first, the direct radial thrust which is received from the efforts of the disks to assume a position at right angles to the shaft, the bearing-faces of the same acting as inclined planes to crowd the ball against the inner surface of the casing; second, the centrifugal action which results from the rapid revolution of the ball around the casing; and, third, the grinding action which results from the rotation of the ball upon its axis. By adapting the disks to rock upon the shaft the ball is permitted to move on radial lines to and from the shaft, according to the amount of material in the casing, without being free at any time from the action of the disks."

The object of my invention is to dispense with the rocking disks employed by Thompson, and to employ two disks which have no rocking movement, but which, on the contrary, are only capable, outside of their movement of revolution, of a movement longitudinally upon the shaft which carries them, which are preferably straight-faced, and which are constantly and automatically pressed from the outside against the ball to an extent sufficient to grasp it and carry it around with them in their revolution, while at the same time leaving the ball free to move in toward the shaft without having a tendency to force the disks apart.

Mechanism embodying my invention is represented in the accompanying drawings and described in this specification, the particular subject-matter claimed as novel being hereinafter definitely specified.

Figure 10:
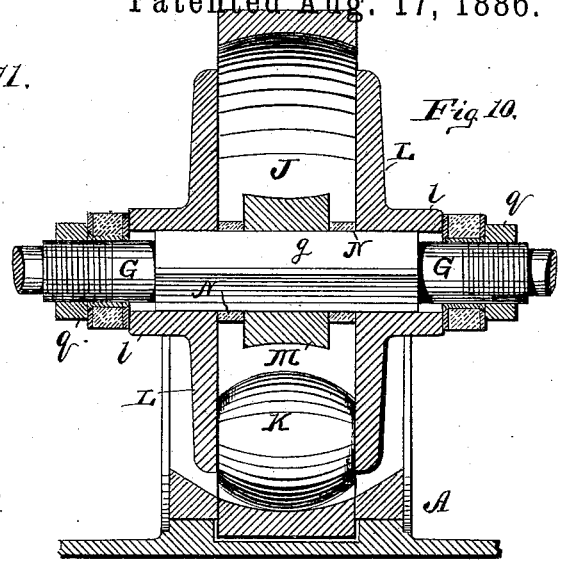
Figure 13:
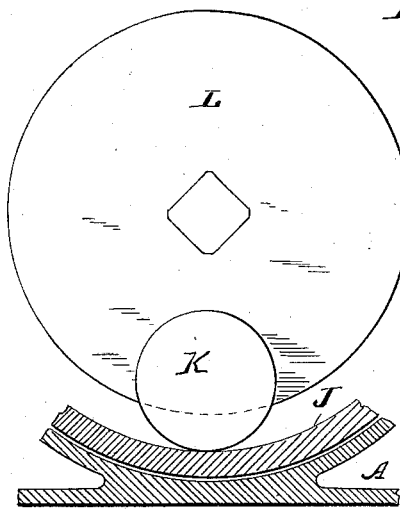
Figure 12:
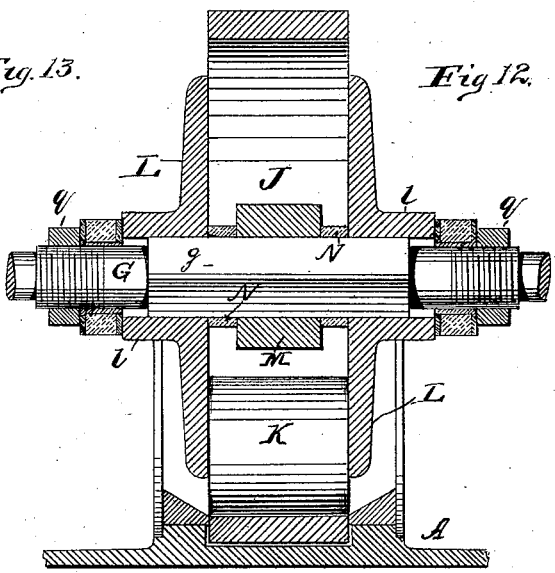

In the drawings, Figure 1 is a central vertical longitudinal sectional elevation through a pulverizer embodying my invention. Fig. 2 is an inside face view of one of the disks; Fig. 3, a central vertical sectional elevation through the same. Fig. 4 is a central sectional elevation, and Fig. 5 a side elevation, of the springs represented in Fig. 1. Fig. 6 is an end elevation, and Fig. 7 a side view, of the collar on the shaft to receive the inward thrust of the ball. Fig. 8 is an end, and Fig. 9 a side, view of one of the spring-controlling nuts on the shaft. Fig. 10 is a central vertical sectional detail of a portion of the shaft, the ball-track, and disks, showing a spheroidal roller in place of a spherical ball. Fig. 11 is a fragmentary side sectional detail of a portion of Fig. 10. Figs. 12 and 13 are views respectively similar to Figs. 10 and 11, but representing a cylindrical instead of a spheroidal roller.

Similar letters of reference indicate corresponding parts.

In the drawings, A represents a cylindriform casing of any preferred character, which supports a hopper, B. The casing is erected within or constitutes an integral portion of a receiver, C, which, in addition, forms the bed-plate of the machine. Upon both sides of the receiver are pedestals E, of any preferred construction, for supporting the bearings F of the driving-shaft G. Beyond the pedestals, upon the projecting extremities of the shaft, are rigidly secured balance-wheels H and pulleys I, for the actuation of the shaft.

J is the ball-track, which may be a part of the casing and not separate therefrom.

K is the ball, roller, or crushing device proper.

All of the foregoing elements may be of any preferred construction common in machines of this class.

$g$ is the central portion of the shaft, which is preferably squared or of polygonal outline.

L are the disks, preferably straight-sided upon their opposing faces, and conveniently provided with hubs $l$, adapted to the squared center of the shaft, so as to fit it and be free for movement endwise upon it.

M is a collar, preferably, when a sphere is employed, concaved upon its peripheral face, and mounted upon the shaft between the disks, the office of which is to protect the shaft against the inward thrust of the ball.

N are two elastic packing-rings interposed between the collar and the respective disks, and serving to keep the dust from the shaft and prevent the cutting out of said shaft.

P are springs, of rubber, spiral metal, or other elastic material, interposed upon the shaft between the outer faces of the hubs of the disks and nuts Q, adapted to be fixed upon said shaft conveniently by means of set-screws $q$. These springs serve to force the disks inward, and cause them to clamp the ball or roller and carry it around with them. In the form represented the springs are annular rings of rubber mounted upon a central tube, $p$, closely fitting the shaft and confined between two annular flanges, $p^\times$, mounted upon said central tube, as shown in Figs. 4 and 5. To adjust the springs to the requisite tension the nuts are adapted to be rotated upon the shaft, thereby compressing the springs between their flanges.

The operation of the machine will be readily understood from the foregoing descriptions without further explanation.

In Figs. 10 and 11 I have represented my device as employed in connection with a spheroidal roller instead of with a sphere, and in Figs. 12 and 13 have represented it in connection with a cylindriform roller. In the employment both of a spheroidal and a cylindrical roller the ends of the roller are preferably flat, so as to present an extended surface for the grip of the disks, while the track and shaft-collar are modified in form to correspond to the exterior contour of said roller.

It is obvious that instead of employing nuts upon the shaft to serve as abutments to resist the outward thrust of the springs, the said springs may bear against the pedestals or other fixed abutment not directly connected with the shaft.

Having thus described my invention, I claim and desire to secure by Letters Patent—

1. In a pulverizing-machine, the following elements in combination: a casing, a driving-shaft, a sphere or roller, and two disks mounted upon the shaft and capable of an end-for-end motion thereon, substantially as set forth.

2. In a pulverizing-machine, the following elements in combination: a casing, a driving-shaft a sphere or roller, two disks mounted upon the shaft and capable of an end-for-end motion thereon, and means for compressing said disks against the ball or roller, substantially as set forth.

3. In a pulverizing-machine of the class herein recited, the combination of a casing, a driving-shaft, a sphere or roller, two disks mounted upon the shaft and capable of an end-for-end motion thereon, and a collar upon the shafts between the disks, which is adapted to receive and thereby protect the shaft against the inward thrust of the ball, substantially as set forth.

4. In a machine of the class recited, in combination with a casing, a driving-shaft, a ball adapted to travel upon a track within said casing, and a pair of disks, the opposing faces of which are flat, so that the ball can travel in toward the shaft without occasioning a movement of the disks, substantially as set forth.

5. In a machine of the class above recited, the combination of a casing containing a ball-track, a ball upon said track, a shaft journaled with respect to said casing, two disks capable of a movement endwise upon said shaft, springs exterior to the disks for forcing the latter disks together, and abutments to resist the outward thrust of the springs, substantially as set forth.

6. In a machine of the class recited, the combination of a shaft, disks upon the shaft, a collar upon the shaft between the disks, and elastic packings between the said collar and the opposing faces of said disks, substantially as set forth.

In testimony whereof I have hereunto signed my name this 20th day of April, A. D. 1886.

HERMANN BERNHARD FELDMANN.

In presence of—
JOHN JOLLEY, Jr.,
F. NORMAN DIXON.